(12) United States Patent
Houser et al.

(10) Patent No.: US 11,159,003 B2
(45) Date of Patent: Oct. 26, 2021

(54) METHOD OF REMOVING FOIL SHIELD FROM CABLE

(71) Applicant: TE CONNECTIVITY CORPORATION, Berwyn, PA (US)

(72) Inventors: Matthew Steven Houser, Hummelstown, PA (US); Joseph Stachura, Lebanon, PA (US); Christopher John Gavlak, Mechanicsburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 301 days.

(21) Appl. No.: 16/359,323

(22) Filed: Mar. 20, 2019

(65) Prior Publication Data

US 2020/0303909 A1    Sep. 24, 2020

(51) Int. Cl.
| | |
|---|---|
| *H02G 1/12* | (2006.01) |
| *H01B 3/30* | (2006.01) |
| *H01R 13/6592* | (2011.01) |
| *H05B 6/02* | (2006.01) |
| *B23K 101/38* | (2006.01) |

(52) U.S. Cl.
CPC ............. *H02G 1/1265* (2013.01); *H01B 3/30* (2013.01); *H01R 13/6592* (2013.01); *H02G 1/1297* (2013.01); *H05B 6/02* (2013.01); *B23K 2101/38* (2018.08)

(58) Field of Classification Search
CPC .. H02G 1/1265; H02G 1/1297; H02G 1/1253; H02G 1/1275; B23K 2101/38; H01R 13/6592; H05B 6/02; H05B 6/14; Y10T 29/49194
USPC .................................................... 29/828, 868
See application file for complete search history.

(56) References Cited

U.S. PATENT DOCUMENTS

| | | | | |
|---|---|---|---|---|
| 4,745,828 | A | * 5/1988 | Stepan | G02B 6/245 81/9.42 |
| 5,361,653 | A | * 11/1994 | Pradin | H02G 1/1265 81/9.51 |
| 10,056,743 | B2 | * 8/2018 | Dober | H02G 1/1253 |
| 2012/0248093 | A1 | 10/2012 | Ulrich et al. | |

FOREIGN PATENT DOCUMENTS

| | | |
|---|---|---|
| DE | 102017221115 B3 | 1/2019 |
| DE | 102017118445 A1 | 2/2019 |

OTHER PUBLICATIONS

International Search Report, International Application No. PCT1B2020/052354 International Filing Date, Mar. 15, 2020.

* cited by examiner

*Primary Examiner* — Donghai D Nguyen

(57) ABSTRACT

A method of removing a foil shield from a cable. The method includes: positioning the cable proximate a heating source; heating the foil shield in a designated area to weaken the foil shield; and removing an outer insulation of the cable and the foil shield after the foil shield has been heated.

15 Claims, 6 Drawing Sheets

METHOD OF REMOVING FOIL SHIELD FROM CABLE

FIELD OF THE INVENTION

The present invention is directed to a process or method to weaken the foil shield on shielded cable using heating. In particular, the present invention is directed to a process or method to weaken the foil shield on shielded cable using induction heating.

BACKGROUND OF THE INVENTION

Certain cable types, such as those used for electric and hybrid vehicles, have a foil shield that must be removed to prepare the cable for termination. The foil consists of a Poly-Ethylene Terephthalate (PET) plastic substrate with aluminum deposited on the bottom. The foil is typically very difficult to remove because it is very thin (0.03 mm thick) and tear-resistant (due to the PET substrate). In addition, the braid shield, which is directly beneath the foil, must not be damaged when the foil is removed.

Current foil removal methods include manual processes, blade processes, and laser processes. Manual processes are slow and costly. Blade processes are typically very expensive and often damage the braid shield. Laser processes are expensive as costly equipment is required.

It would, therefore, be beneficial to provide a cost effective and efficient process or method to remove the foil without damaging the braid shield or the other components of the cable. In addition, it would be advantageous to provide a system or method of removing the foil which can be uses as a stand-alone process or method or as an integrated method in a machine which performs other functions on the cable.

SUMMARY OF THE INVENTION

The invention is directed to a process or method that uses heating, such as, but not limited to, induction heating, to weaken the foil in the area where it will be removed. The heating generates heat in the aluminum component of the foil, which heats the Poly-Ethylene Terephthalate (PET) plastic component of the foil and either melts it or vaporizes it. The foil can be heated either through the outer insulation, or the outer insulation can be pre-cut to allow the vaporized PET to escape. When the PET plastic melts beneath the outer insulation, it sticks to the outer insulation as it cools. This allows for the foil and outer insulation to be removed in one step.

An embodiment is directed to a method of removing a foil shield from a cable, the method comprising: positioning the cable proximate an induction heating source; heating the foil shield in a designated area to weaken the foil shield; and removing an outer insulation of the cable and the foil shield after the foil shield has been heated.

An embodiment is directed to a method of removing a foil shield from a cable, the method comprising: positioning the cable proximate an induction heating source; heating the foil shield by induction heating in a designated area to weaken the foil shield; removing the induction heating source; cutting an outer insulation of the cable in the designated area; and removing the outer insulation of the cable and the foil shield from the designated area.

An embodiment is directed to a method of removing a foil shield from a cable, the method comprising: positioning the cable proximate an induction heating source; exposing a portion of the foil shield in the designated area by cutting the outer insulation; heating the foil shield by induction heating in a designated area to weaken the foil shield; removing the induction heating source; and removing the outer insulation of the cable and the foil shield from the designated area.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
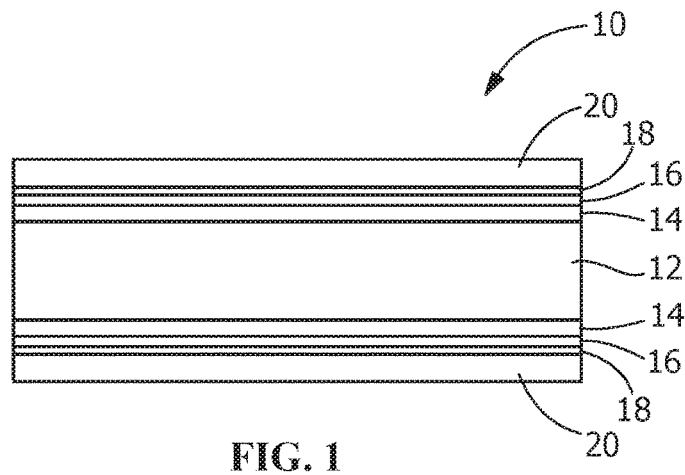
FIG. 1 is a longitudinal cross-section of an illustrative high voltage cable which has a foil shield provided therein.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
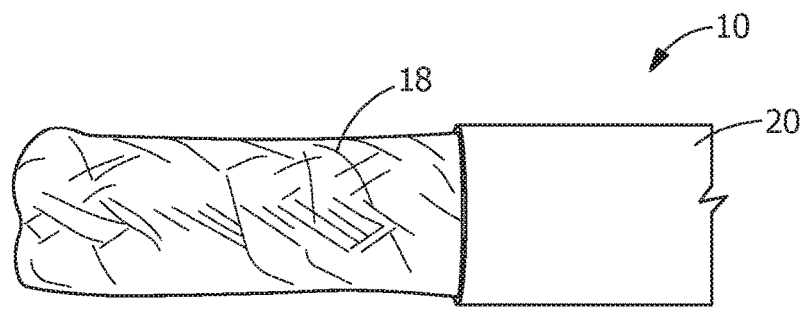
FIG. 2 is a perspective view of the cable with a portion of the outer insulation removed to show the foil shield.

Referring to FIGS. 1 and 2, an illustrative embodiment of an electrical cable 10 is shown. In the embodiment shown, the cable 10 is a high voltage cable, but other cables can be used. The cable 10 includes a conductor 12 which conducts the electrical current. Inner insulation 14 extends circumferentially around the conductor 12. A braid shield 16 extends circumferentially around the inner insulation 14. A foil shield 18 extends circumferentially around the braid shield 16. Outer insulation 20 extends circumferentially around the foil shield 18. In the illustrative embodiment shown, the foil shield 18 has an aluminum component and a Poly-Ethylene Terephthalate (PET) plastic component, however, other components may be used.

In order to terminate the cable 10 as required for particular applications, the foil shield 18 must be removed to allow for termination of the conductor 12 of the cable 10. However, the foil shield 18 is typically very difficult to remove because it is very thin (for example, 0.03 mm thick) and tear-resistant. In addition, the braid shield 16, which is directly beneath the foil shield 18, must not be damaged when the foil shied 18 is removed. The method as described and claimed herein allows the foil shield 18 to be efficiently and cost effectively removed without damaging the braid shield 16 or other components of the cable 10.

Figure 3:
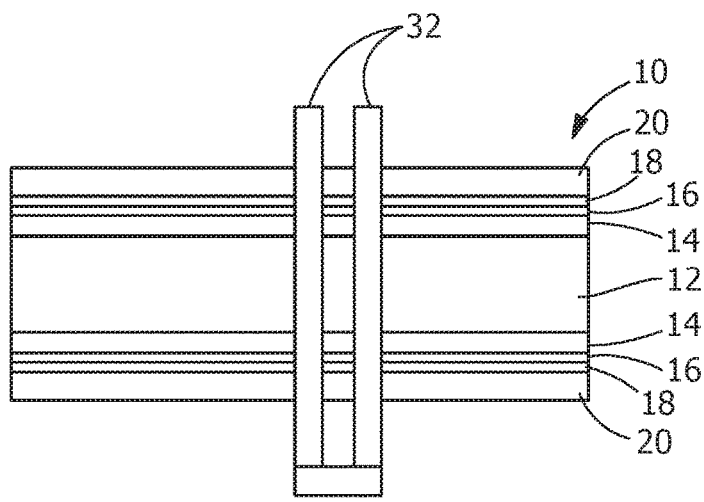
FIG. 3 is a diagrammatic view of the longitudinal cross-section of the illustrative cable with an induction coil extending around the circumference of a section of the cable.
Figure 4:
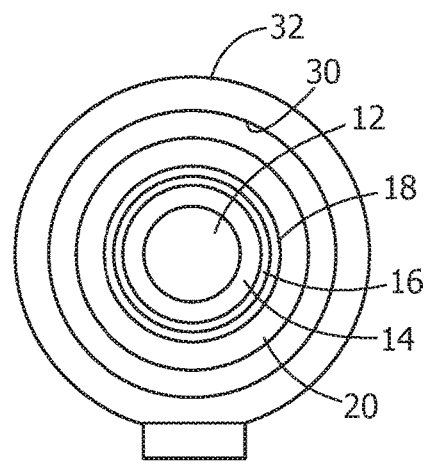
FIG. 4 is a diagrammatic end view of the illustrative cable with the induction coil extending around the circumference of a section of the cable, as shown in FIG. 3.

Referring to FIGS. 3 through 9, the cable 10 is positioned in an opening 30 of an induction coil 32, as shown in FIGS. 3 and 4. Alternatively, the opening 30 of the induction coil 32 is positioned over the cable 10. The induction coil 32 is positioned over an area 34 of the cable 10 in which the foil shield 18 and the outer conductor 20 are to be removed or stripped from the cable 10 to expose the braid shield 16. The opening 30 of the induction coil 32 is dimensioned to fit over the outer insulation 20 without engaging the outer insulation 20.

Figure 5:
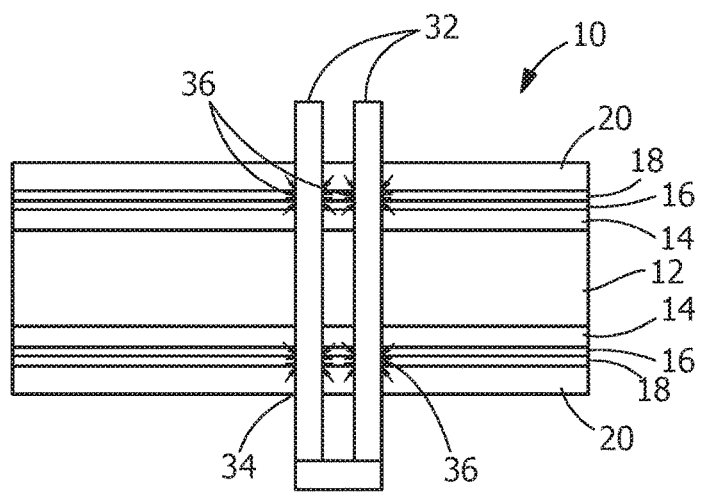
FIG. 5 is a diagrammatic view of the longitudinal cross-section of the illustrative cable with the induction coil extending around the circumference of a section of the cable, the induction coil applying heat to the cable.
Figure 6:
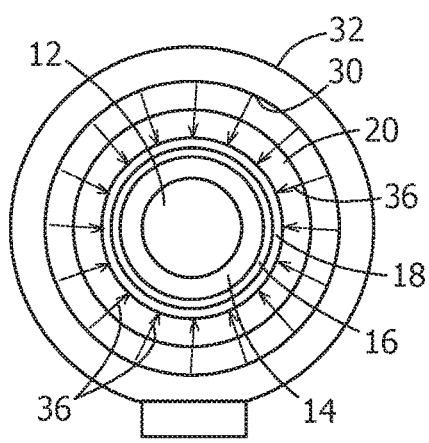
FIG. 6 is a diagrammatic end view of the illustrative cable with the induction coil extending around the circumference of a section of the cable, the induction coil applying heat to the cable, as shown in FIG. 5.

With the induction coil 32 properly positioned, the induction coil 32 is powered, causing the induction coil to generate a rapidly alternating magnetic field which causes heat to be generated in the foil shield 18, as represented by 36 in FIGS. 5 and 6. In the embodiment shown in FIGS. 5 and 6, the foil shield 18 is heated through the outer insulation 20. The induction heating generates heat in the aluminum component of the foil shield 18 in the designated or affected area 34, which heats the plastic component of the foil shield 18 in the designated or affected area above a melting point of the plastic component. As the plastic component is melted, the plastic component pools together and forms voids in which only the aluminum component remains. As the aluminum component is thin and has little shear or tensile strength, the pooling of the plastic component and the forming of voids weakens the foil shield 18 in the designated or affected area 34.

The power is supplied to the induction coil 32 for a specified amount of time based on the application. The frequency of the induction coil 32 may be varied to control the depth of heating or skin depth, for example, higher frequency allows the depth of the induction heating to be controlled such that the penetration of the induction heating is shallow, whereby the induction heating does not penetrate into the braid shield 16 or the conductor 12. Whereas, a lower frequency allows induction heating to more deeply penetrate into the braid shield 16 or the conductor 12.

Figure 7:
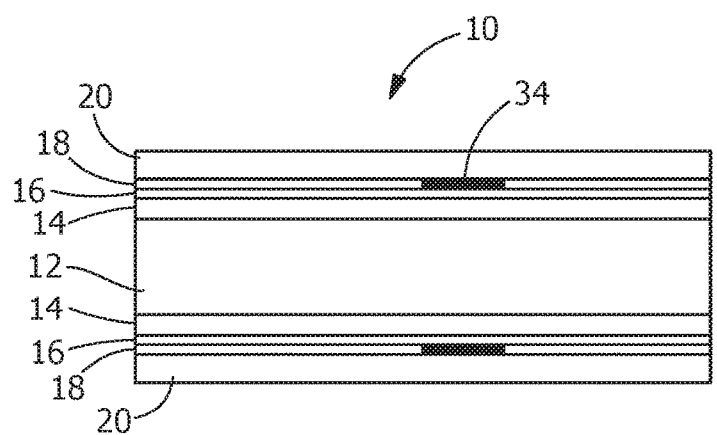
FIG. 7 is a diagrammatic view of the longitudinal cross-section of the illustrative cable illustrating the heat effected area of the cable.

As represented in FIG. 7, after the specified time, the heat generated by the induction coil 32 is stopped and the induction coil 32 is removed from proximate the designated or affected area 34 of the cable 10. With the heat removed, the melted pooled plastic component is allowed to cool. As the plastic component is cooled, the plastic component and the foil shield 18 in the designated or affected area 34 sticks or adheres to the outer insulation 20. This allows for the foil shield 18 and outer insulation 20 to act as one piece in the designated or affected area 34.

Figure 8:
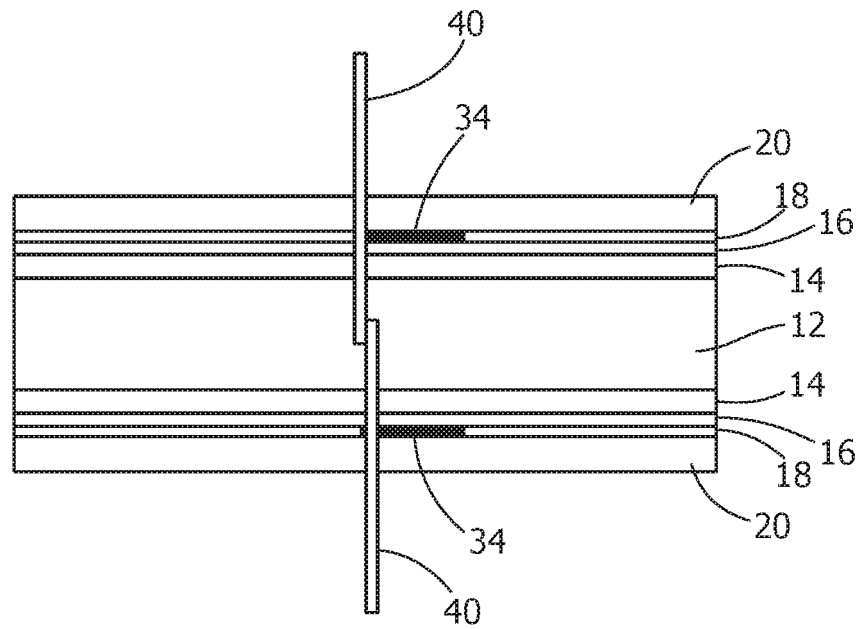
FIG. 8 is a diagrammatic view of the longitudinal cross-section of the illustrative cable illustrating stripping blades in engagement with the outer insulation of the cable.

As best shown in FIG. 8, the stripping blades 40 are then moved into engagement with the outer insulation 20 at one end of the designated or affected area 34 of the cable 10. Alternatively, the designated or affected area 34 of the cable 10 is moved into position relative to the stripping blades 40. As this occurs, the sharp edges of the stripping blades 40 pierce or cut the outer insulation 20. The depth of the stripping blades 40 is controlled to ensure that the stripping blades 40 do not contact the braid shield 16. In various embodiments, the stripping blades 40 may contact the foil shield 18, while in other embodiments, the stripping blades 40 may not contact the foil shield 18.

Figure 9:
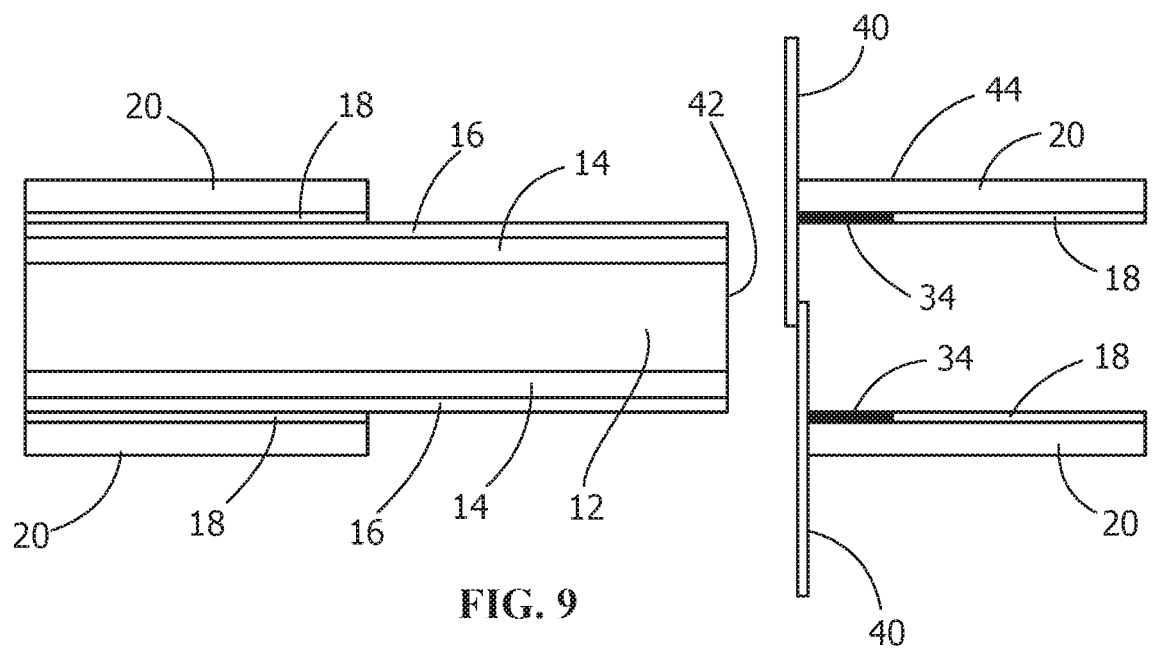
FIG. 9 is a diagrammatic view of the longitudinal cross-section of the illustrative cable illustrating the stripping blades removing the outer insulation and the foil shield of the cable.

With the stripping blades 40 properly positioned relative to the outer insulation 20, the stripping blades 40 are moved in an axial direction relative to the cable 10 toward a free end 42 of the cable 10, as represented in FIG. 9. As the stripping blades 40 are in engagement with the outer insulation 20, the movement of the stripping blades 40 in the axial direction causes the cut portion 44 of the outer insulation 20 to be moved axially relative to the cable 10 simultaneously with the stripping blades 40.

As the foil shield 18 is adhered to the outer insulation 20 in the designated or affected area 34, the movement of the outer insulation 20 in the cut portion 44 causes the foil shield 18 in the cut portion 44 to be moved axially relative to the cable 10 simultaneously with the stripping blades 40. As this occurs, the weakened foil shield 18 in the designated or affected area 34 tears and is released from the foil shield 18 in the non-cut portion 46 of the cable 10.

Referring to FIGS. 10 through 16, an alternate illustrative method or process of removing the foil shield 18 from the cable 10 is shown. In this illustrative embodiment the stripping blades 40 are moved into position relative to designated or affected area 34 proximate the free end 42 of the cable 10. Alternatively, the designated or affected area 34 of the cable 10 is moved into position relative to the stripping blades 40.

Figure 10:
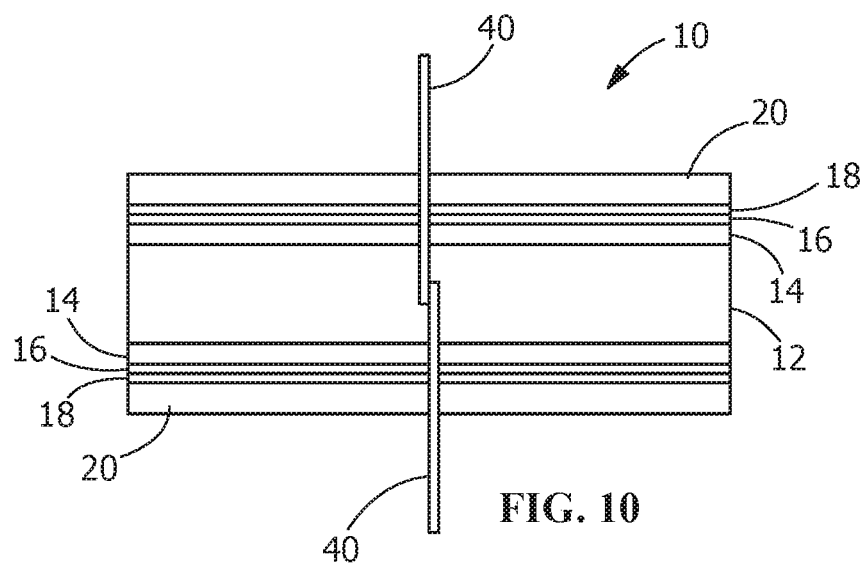
FIG. 10 is a diagrammatic view of the longitudinal cross-section of the illustrative cable illustrating an alternate step in which the stripping blades are in engagement with the outer insulation of the cable prior to the induction coil applying heat to the cable.

The stripping blades 40 are moved into engagement with the outer insulation 20, as shown in FIG. 10. As this occurs, the sharp edges of the stripping blades 40 pierce or cut the outer insulation 20. The depth of the stripping blades 40 is controlled to ensure that the stripping blades 40 do not contact the foil shield 18 or the braid shield 16.

Figure 11:
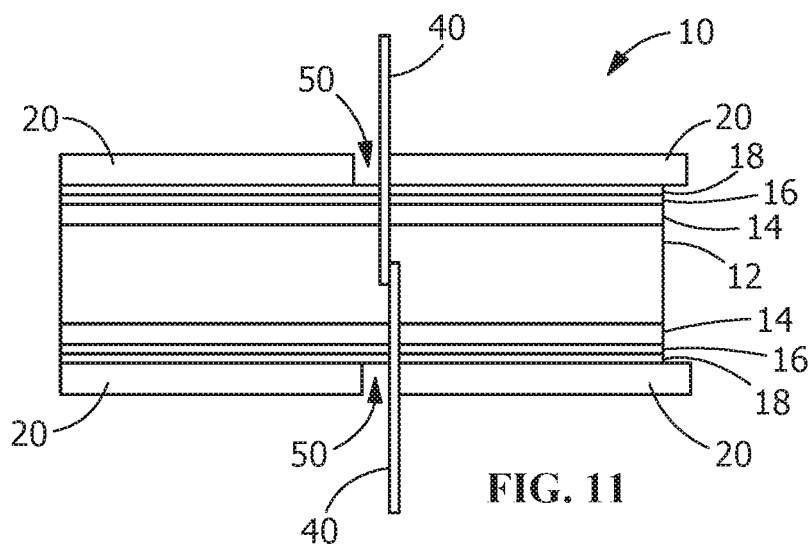
FIG. 11 is a diagrammatic view of the longitudinal cross-section of the illustrative cable of FIG. 10 illustrating the stripping blades partially removing the outer insulation and exposing a portion of the foil shield of the cable.

With the stripping blades 40 properly positioned relative to the outer insulation 20, the stripping blades 40 are moved a controlled distance in an axial direction relative to the cable 10 toward a free end 42 of the cable 10 to form an opening or split 50 in the outer insulation 20 of the cable 10, as represented in FIG. 11, thereby exposing a portion of the foil shield 18 in the designated or affected area 34 through the opening 50.

Figure 12:
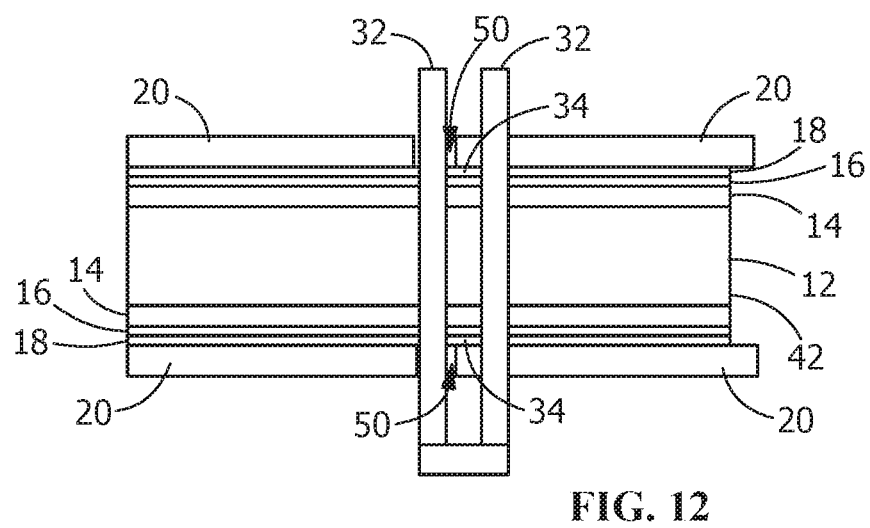
FIG. 12 is a diagrammatic view of the longitudinal cross-section of the illustrative cable with an induction coil extending around the circumference of a section of the cable of FIG. 10.

With a portion of the foil shield 18 in the designated or affected area 34 exposed, the stripping blades 40 are retracted and the cable 10 is positioned in an opening 30 of an induction coil 32, as shown in FIG. 12. Alternatively, the opening 30 of the induction coil 32 is positioned over the cable 10. The induction coil 32 is positioned over an area 34 of the cable 10 in which the foil shield 18 and the outer conductor 20 are to be removed or stripped from the cable 10 to expose the braid shield 16. The opening 30 of the induction coil 32 is dimensioned to fit over the outer insulation 20 without engaging the outer insulation 20.

Figure 13:
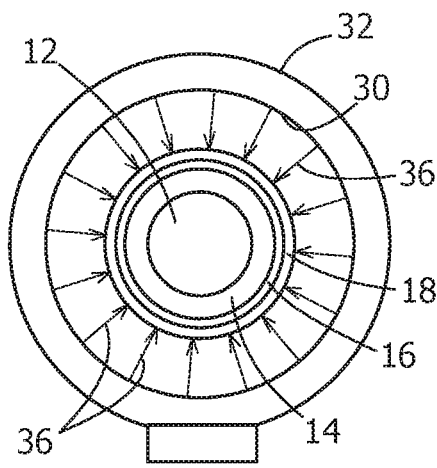
FIG. 13 is a diagrammatic end view of the illustrative cable with the induction coil extending around the circumference of a section of the cable, the induction coil applying heat to the cable.

With the induction coil 32 properly positioned, the induction coil 32 is powered, causing the induction coil to generate a rapidly alternating magnetic field which causes heat to be generated in the foil shield 18, as represented by 36 in FIGS. 13. In the embodiment shown in FIG. 13, the foil shield 18 is heated through the opening 50. The induction heating generates heat in the aluminum component 51 of the foil shield 18 in the designated or affected area 34, which heats the plastic component of the foil shield 18 in the designated or affected area above a melting point of the plastic component. As the plastic component is melted, the plastic component exposed in the opening 50 is vaporized and escapes, while the plastic component proximate the opening 50 beneath the outer insulation 20 melts. As only the aluminum 51 component remains in the portion of the designated or affected area 34 which is exposed to the opening 50, the aluminum component 51 is thin and has little shear or tensile strength, causing the foil shield 18 to be weak in the designated or affected area 34 which is exposed to the opening 50.

The power is supplied to the induction coil 32 for a specified amount of time based on the application. The frequency of the induction coil 32 may be varied to control the depth of heating or skin depth. For example, a higher frequency allows the depth of the induction heating to be controlled such that the penetration of the induction heating is shallow, whereby the induction heating does not penetrate into the braid shield 16 or the conductor 12. Whereas, a lower frequency allows induction heating to more deeply penetrate into the braid shield 16 or the conductor 12.

Figure 14:
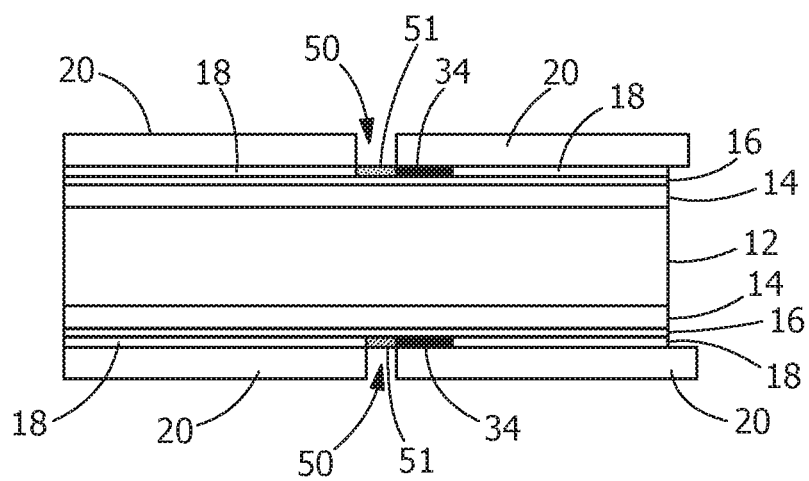
FIG. 14 is a diagrammatic view of the longitudinal cross-section of the illustrative cable of FIG. 13, illustrating the heat effected area of the cable.

As represented in FIG. 14, after the specified time, the heat generated by the induction coil 32 is stopped and the induction coil 32 is removed from proximate the designated or affected area 34 of the cable 10. With the heat removed, the melted plastic component below the outer insulation 20 is allowed to cool. As the plastic component is cooled, the plastic component and the foil shield 18 in the designated or affected area 34 beneath the outer insulation 20 sticks or adheres to the outer insulation 20. This allows for the foil shield 18 and outer insulation 20 to act as one piece in the designated or affected area 34.

Figure 15:
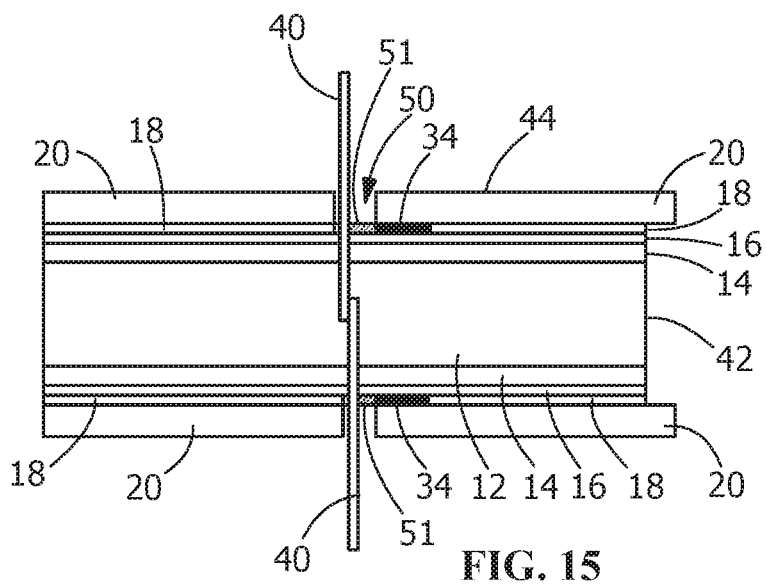
FIG. 15 is a diagrammatic view of the longitudinal cross-section of the illustrative cable of FIG. 14, illustrating stripping blades in engagement with the outer insulation of the cable.

As best shown in FIG. 15, the stripping blades 40 are again moved into engagement with the outer insulation 20 at one end of the designated or affected area 34 of the cable 10. Alternatively, the designated or affected area 34 of the cable 10 is moved into position relative to the stripping blades 40. As this occurs, the sharp edges of the stripping blades 40 pierce or cut the outer insulation 20. The depth of the stripping blades 40 is controlled to ensure that the stripping blades 40 do not contact the braid shield 16. In various embodiments, the stripping blades 40 may contact the foil shield 18, while in other embodiments, the stripping blades 40 may not contact the foil shield 18.

Figure 16:
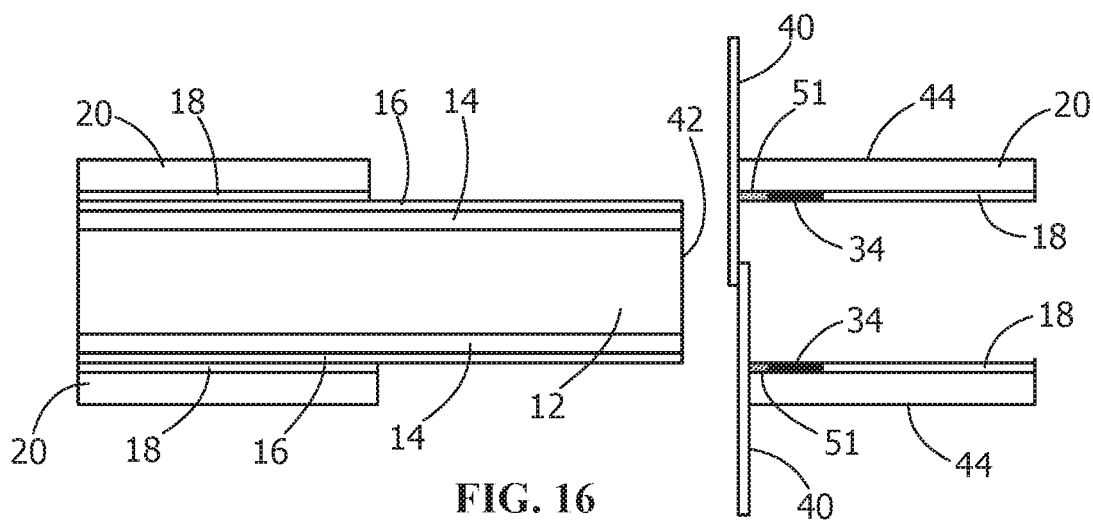
FIG. 16 is a diagrammatic view of the longitudinal cross-section of the illustrative cable of FIG. 15, illustrating the stripping blades removing the outer insulation and the foil shield of the cable.

With the stripping blades 40 properly positioned relative to the outer insulation 20, the stripping blades 40 are moved in an axial direction relative to the cable 10 toward a free end 42 of the cable 10, as represented in FIG. 16. As the stripping blades 40 are in engagement with the outer insulation 20, the movement of the stripping blades 40 in the axial direction causes the cut portion 44 of the outer insulation 20 to be moved axially relative to the cable 10 simultaneously with the stripping blades 40.

As the foil shield 18 is adhered to the outer insulation 20 in the designated or affected area 34, the movement of the outer insulation 20 in the cut portion 44 causes the foil shield 18 in the cut portion 44 to be moved axially relative to the cable 10 simultaneously with the stripping blades 40. As this occurs, the weakened foil shield 18 in the designated or affected area 34 tears and is released from the foil shield 18 in the non-cut portion 46 of the cable 10.

Figure 17:
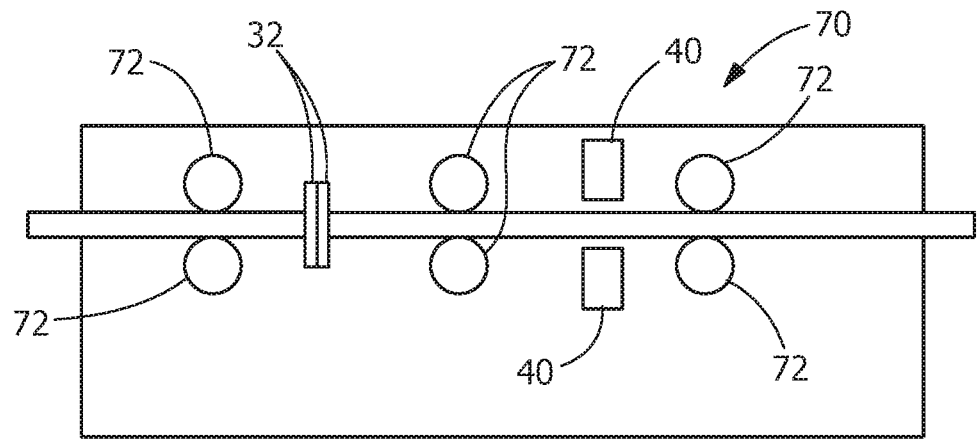
FIG. 17 is a diagrammatic view illustrating the induction coil integrated into a machine the performs other functions of the cable.

The method described with respect to the embodiment shown in FIGS. 1 through 16 may be integrated in a machine 70 which performs other functions on the cable 10, as shown in FIG. 17. The machine 70 may include, but is not limited to the induction coil 32, feed wheels 72 and cutting blades 40. Representative machines 70 include, but are not limited to, cut-to-length machines, cut-and-strip machines or lead makers. The cable 10 may feed from a spool (not shown). The machine 70 will pause feeding the cable 10 in specified areas where the induction coil 32 operates and where the outer jacket 20 and foil shield 18 is stripped.

The invention is directed to a process or method that uses induction heating to weaken the foil in the area where it will be removed. The induction heating generates heat in the aluminum component of the foil, which heats the plastic component of the foil and either melts it or vaporizes it. The foil can be heated either through the outer insulation, or the outer insulation can be pre-cut to allow the vaporized plastic component to escape. When the plastic component melts beneath the outer insulation, it sticks to the outer insulation as it cools. This allows for the foil and outer insulation to be removed in one step. The method allows different materials or components and different cable sizes, configurations and diameters to be accommodated by changing variables including power, frequency, heat applied time, and coil geometry. The method also allows for different heating elements and heating processes and is not limited to induction coils and induction heating.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A method of removing a foil shield from a cable, the foil shield having a metal component and a plastic component, the method comprising:
    positioning the cable proximate an induction heating source;
    heating the foil shield in a designated area to soften or melt the plastic component and weaken the foil shield;
    allowing the plastic component of the foil shield to cool and adhere to an outer insulation of the cable in the designated area; and then
    removing the outer insulation of the cable and the foil shield after the foil shield has been heated.

2. The method as recited in claim 1, wherein the metal component is aluminum and the plastic component is polyethylene terephthalate.

3. The method as recited in claim 1, further comprising heating the metal component of the foil shield in the designated area by induction heating above a melting point of the plastic component.

4. The method as recited in claim 1, wherein the plastic component in the designated area is vaporized.

5. The method as recited in claim 1 further comprising varying a frequency of the induction heating source to control a depth of heating.

6. The method as recited in claim 1, wherein the foil shield in the designated area is heated through the outer insulation.

7. The method as recited in claim 1, further comprising exposing a portion of the foil shield in the designated area to allow the plastic component to vaporize.

8. The method as recited in claim 1, wherein the induction heating source is a heating coil which extends about the circumference of the cable in the designated area.

9. The method as recited in claim 1, wherein the induction heating source is positioned into a machine that cuts the cable to length.

10. The method as recited in claim 1, further comprising varying power applied to the induction heating source.

11. The method as recited in claim 1, further comprising varying an amount of time the induction heating source is powered.

12. A method of removing a foil shield from a cable, the foil shield having a metal component and a plastic component, the method comprising:
    positioning the cable proximate an induction heating source;
    heating the metal component of the foil shield by induction heating through outer insulation of the cable in a designated area to soften or melt the plastic component and weaken the foil shield;
    removing the induction heating source;
    allowing the plastic component of the foil shield to cool and adhere to the outer insulation in the designated area prior to the outer insulation of the cable and the foil shield being removed from the designated area;
    cutting the outer insulation of the cable in the designated area; and
    removing the outer insulation of the cable and the foil shield from the designated area.

13. The method as recited in claim 12, wherein the foil shield in the designated area is heated through the outer insulation.

14. The method as recited in claim 12, further comprising exposing a portion of the foil shield in the designated area by cutting the outer insulation.

15. A method of removing a foil shield from a cable, the foil shield having a metal component and a plastic component, the method comprising:
    positioning the cable proximate an induction heating source;
    exposing a portion of the foil shield in a designated area by cutting an outer insulation of the cable;
    heating the foil shield in the designated area to soften or melt the plastic component and weaken the foil shield;
    removing the heating source;
    allowing the plastic component of the foil shield to cool and adhere to the outer insulation in the designated area; and then
    removing the outer insulation of the cable and the foil shield from the designated area.

* * * * *